United States Patent
Womack

(10) Patent No.: US 11,565,749 B1
(45) Date of Patent: Jan. 31, 2023

(54) SYSTEMS, DEVICES, AND/OR METHODS FOR GROUNDSKEEPING

(71) Applicant: Bernard A. Womack, Shenandoah, VA (US)

(72) Inventor: Bernard A. Womack, Shenandoah, VA (US)

(*) Notice: Subject to any disclaimer, the term of this patent is extended or adjusted under 35 U.S.C. 154(b) by 0 days.

(21) Appl. No.: 17/565,089

(22) Filed: Dec. 29, 2021

(51) Int. Cl.
| | |
|---|---|
| *B62D 11/02* | (2006.01) |
| *A01D 75/00* | (2006.01) |
| *A01D 34/00* | (2006.01) |
| *B62D 1/02* | (2006.01) |
| *B62D 11/00* | (2006.01) |
| *A01D 43/16* | (2006.01) |
| *A01D 101/00* | (2006.01) |

(52) U.S. Cl.
CPC ............ *B62D 11/02* (2013.01); *A01D 34/006* (2013.01); *A01D 43/16* (2013.01); *A01D 75/008* (2013.01); *B62D 1/02* (2013.01); *B62D 11/006* (2013.01); *A01D 2101/00* (2013.01)

(58) Field of Classification Search
CPC ........ B62D 11/02; B62D 1/02; B62D 11/006; A01D 34/006; A01D 43/16; A01D 75/008; A01D 2101/00
See application file for complete search history.

(56) References Cited

U.S. PATENT DOCUMENTS

| | | | | |
|---|---|---|---|---|
| 4,299,137 A * | 11/1981 | Malecha | .................. | G05G 1/36 180/315 |
| 7,849,941 B2 * | 12/2010 | Bares | .................. | B62D 11/006 180/6.32 |
| 8,522,901 B1 * | 9/2013 | VanLue | .................. | B62D 11/04 56/15.8 |
| 9,021,914 B1 * | 5/2015 | Newcomb | ............. | F16H 63/067 74/481 |
| 10,046,798 B2 * | 8/2018 | Reeves | .................. | B62D 51/02 |
| 10,293,855 B2 * | 5/2019 | Swecker | ................ | B62D 11/04 |
| 2013/0249179 A1 * | 9/2013 | Burns, Jr. | ................ | B62D 7/08 280/93.504 |

* cited by examiner

*Primary Examiner* — Jacob D Knutson
*Assistant Examiner* — Marlon A Arce
(74) *Attorney, Agent, or Firm* — Dale Jensen, PLC; Dale Jensen

(57) ABSTRACT

Certain exemplary embodiments can provide a system comprising a zero turn riding lawnmower. The zero turn riding lawnmower is steerable solely via a first foot pedal and a second foot pedal. Each of the first foot pedal and the second foot pedal coupled to a mower linkage of the zero turn riding lawnmower. The first foot pedal is constructed to cause at least one wheel on a first side the zero turn riding lawnmower to be powered in a forward direction or a reverse direction. The second foot pedal is constructed to cause at least one wheel on a second side the zero turn riding lawnmower to be powered in a forward or reverse direction.

17 Claims, 15 Drawing Sheets

SYSTEMS, DEVICES, AND/OR METHODS FOR GROUNDSKEEPING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments utilize a riding lawnmower that has been constructed and/or modified to allow steering of the riding lawnmower solely via feet of a user. Zero turn riding lawnmowers can be amenable to control solely via foot pedals. A user can perform tasks more efficiently with a riding lawnmower controlled solely via foot pedals. For example, a user can perform edging and/or weed eating work while controlling the riding lawnmower with feet only. The user can utilize both hands to perform edging, weed eating, and/or other tasks that utilize handheld devices such as blowers, etc. because hands and/or arms of the user are not utilized in controlling movement of the riding lawnmower.

Zero turn riding lawnmowers can be modified for foot control via removal of a portion of hand levers that would otherwise be used for control when grasped by hands of the user. A forward/reverse rod is coupled to a remaining portion of a hand lever on each side of the zero turn riding lawnmower. Each forward/reverse rod is coupled to a foot pedal, which can then be actuated by the user as a substitute for the hand levers.

Certain exemplary embodiments can provide a system comprising a zero turn riding lawnmower. The zero turn riding lawnmower is steerable solely via a first foot pedal and a second foot pedal. Each of the first foot pedal and the second foot pedal coupled to a mower linkage of the zero turn riding lawnmower. The first foot pedal is constructed to cause at least one wheel on a first side the zero turn riding lawnmower to be powered in a forward direction or a reverse direction. The second foot pedal is constructed to cause at least one wheel on a second side the zero turn riding lawnmower to be powered in a forward or reverse direction.

Figure 1:
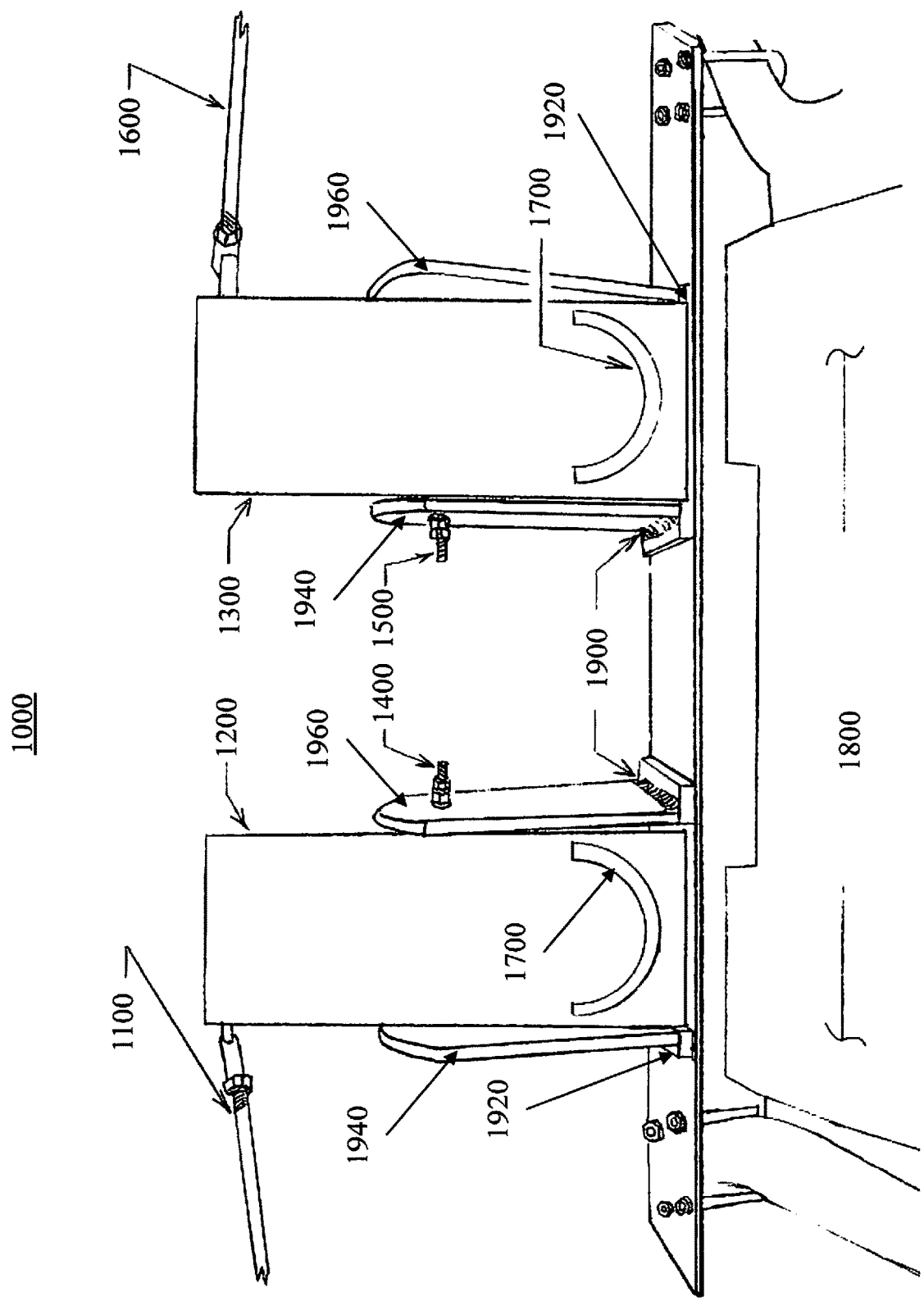
FIG. 1 is a perspective view of an exemplary embodiment of a system 1000.

FIG. 1 is a perspective view of an exemplary embodiment of a system 1000, which comprises a first forward/reverse rod 1100, a first foot pedal 1200, a second foot pedal 1300, a first pivot pin 1400, a second pivot pin 1500, a second forward/reverse rod 1600, a heel cup 1700, a mower floor pan area 1800, and welded joints 1900.

Figure 7:
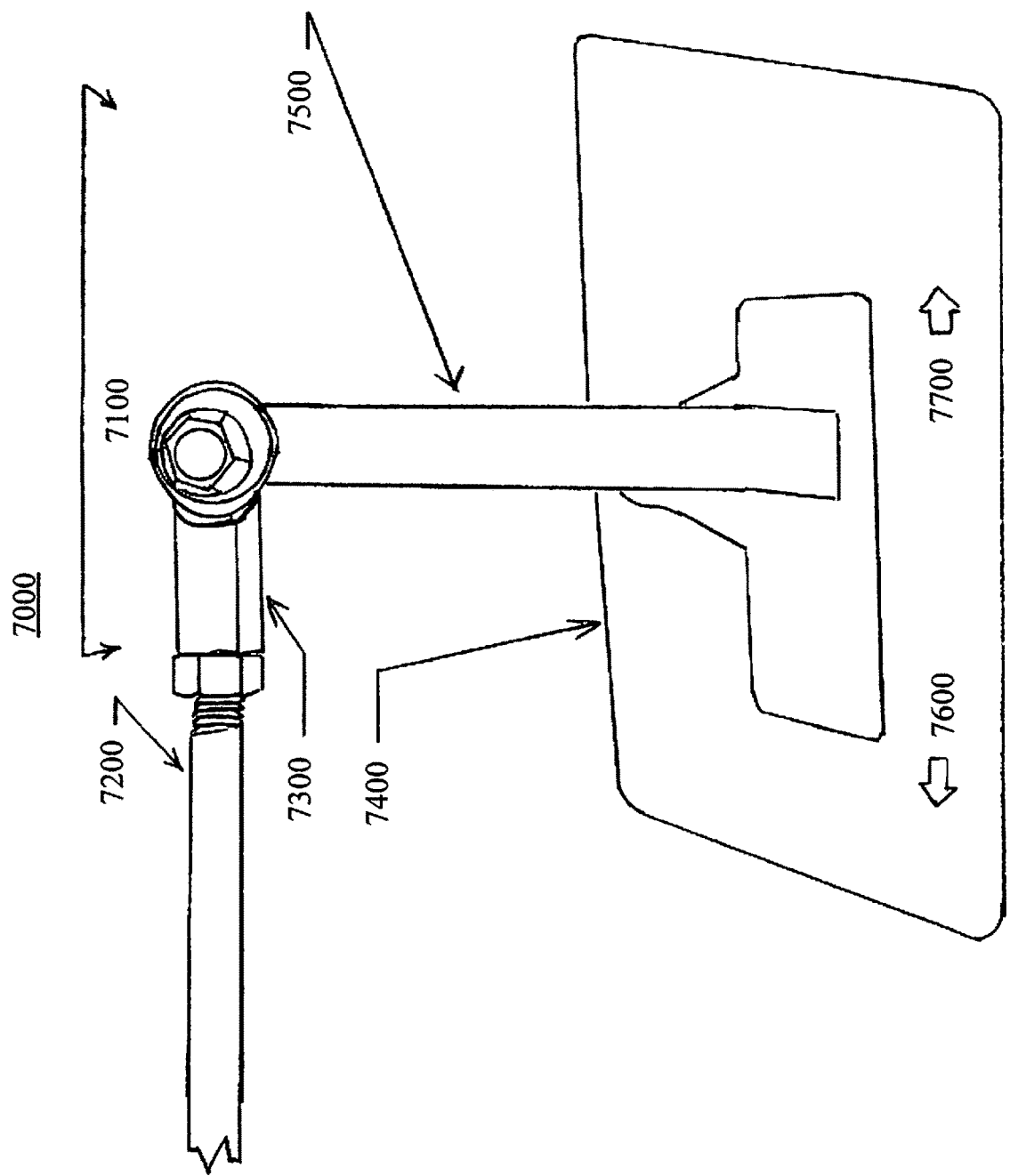
FIG. 7 is a perspective view of an exemplary embodiment of a system 7000.
Figure 8:
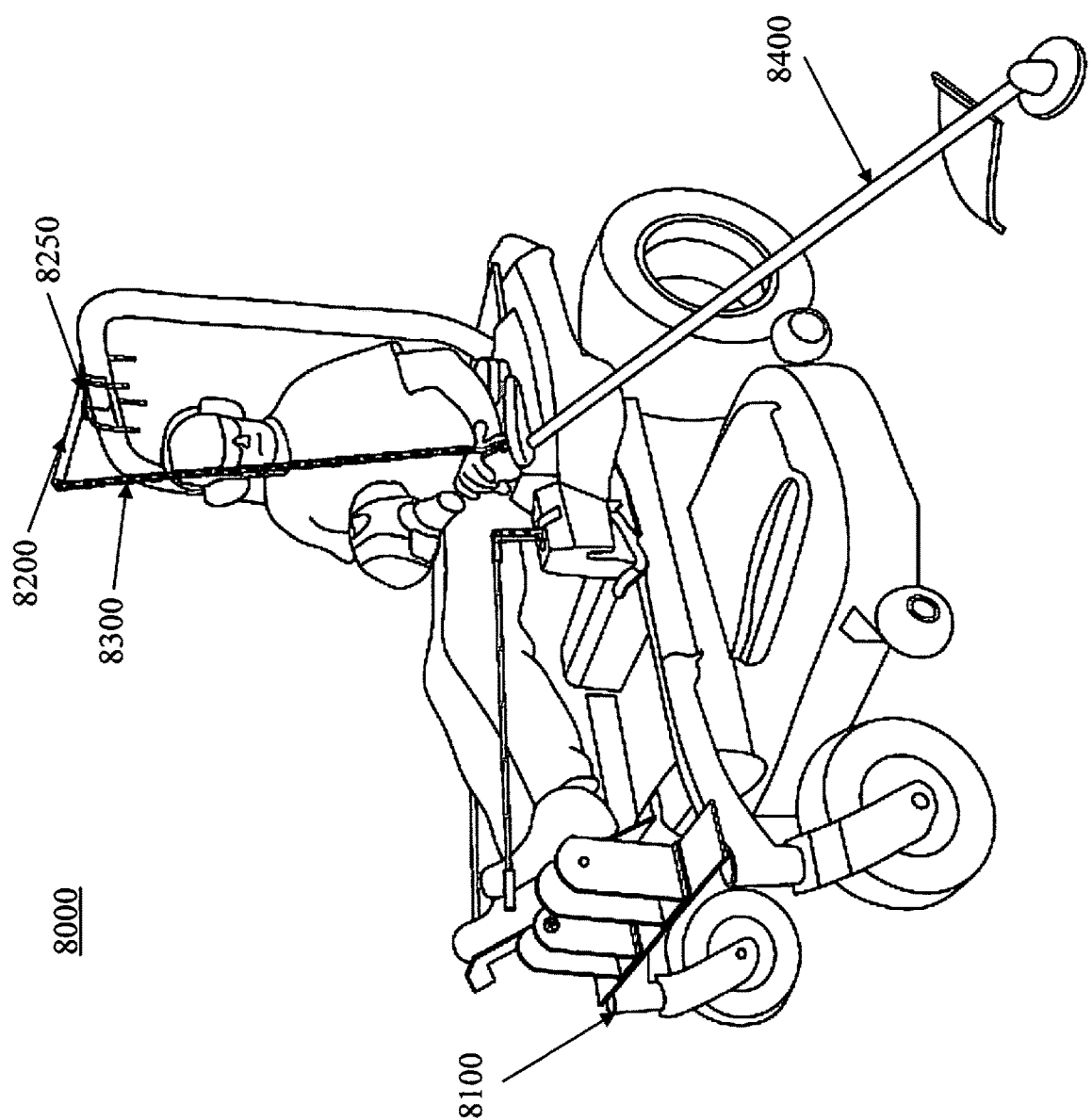
FIG. 8 is a perspective view of an exemplary embodiment of a system 8000.

Certain exemplary embodiment, comprise a zero turn riding lawnmower (e.g., zero turn riding lawnmower 8100 of FIG. 8). The zero turn riding lawnmower is constructed and/or modified to be steerable solely via first foot pedal 1200 and second foot pedal 1300. Each of first foot pedal 1200 and second foot pedal 1300 are coupled to a mower linkage (e.g., mower linkage 7500 of FIG. 7) of the zero turn riding lawnmower. First foot pedal 1200 is constructed to cause at least one wheel on a first side the zero turn riding lawnmower to be powered in a forward direction or a reverse direction. Second foot pedal 1300 is constructed to cause at least one wheel on a second side the zero turn riding lawnmower to be powered in a forward or reverse direction.

First forward/reverse rod 1100 couples the first foot pedal 1200 to the mower linkage (e.g., mower linkage 7500 of FIG. 7).

First pivot pin 1400 is coupled to first foot pedal 1200. In certain exemplary embodiments, first pivot pin 1400 comprises a grease fitting (e.g., grease fitting 2700 of FIG. 2).

At least one of first foot pedal 1200 and second foot pedal 1300 are constructed to cause the zero turn riding lawnmower to accelerate when actuated by a user. At least one of first foot pedal 1200 and second foot pedal 1300 are constructed to cause the zero turn riding lawnmower to decelerate when actuated by a user.

Each of first foot pedal 1200 and second foot pedal 1300 are coupled to the zero turn riding lawnmower via a bracket 1920. Each bracket 1920 comprises a first plate 1940 and a second plate 1960. An angle of first plate 1940 and second plate 1960 slants towards an operator when seated.

Each of first foot pedal 1200 and second foot pedal 1300 are coupled to the zero turn riding lawnmower via a corresponding bracket 1920. Each bracket 1920 comprises a first plate 1940 and a second plate 1960. Each of first pivot pin 1400 and second pivot pin 1500 are utilized to couple each foot pedal to the corresponding bracket.

Each of first foot pedal 1200 and second foot pedal 1300 comprise a heel cup 1700. Heel cup 1700 is constructed to engage with a heel of a foot of a user.

Figure 2:
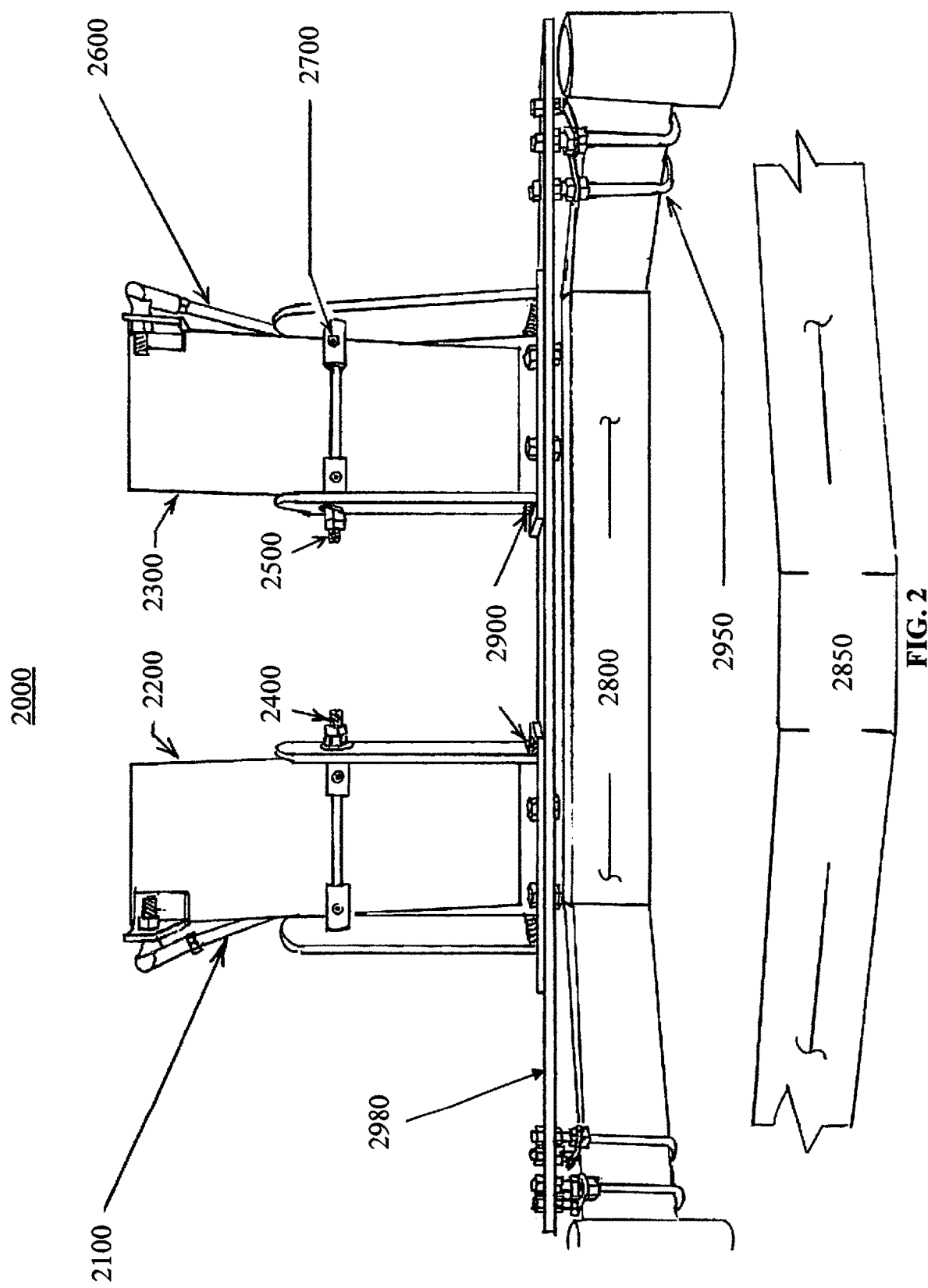
FIG. 2 is an end view of an exemplary embodiment of a system 2000.

FIG. 2 is an end view of an exemplary embodiment of a system 2000, which comprises a first forward/reverse rod 2100, a first foot pedal 2200, a second foot pedal 2300, a first pivot pin 2400, a second pivot pin 2500, a second forward/reverse rod 2600, a grease fitting 2700, a mower frame 2800, a mower deck front area 2850, welded joints 2900, and a set of U-clamps 2950.

Set of U-clamps 2950 couple a plate 2980 to mower frame 2800 of the zero turn riding mower. Plate 2980 is coupled to first foot pedal 2200 and second full pedal 2300.

Figure 3:
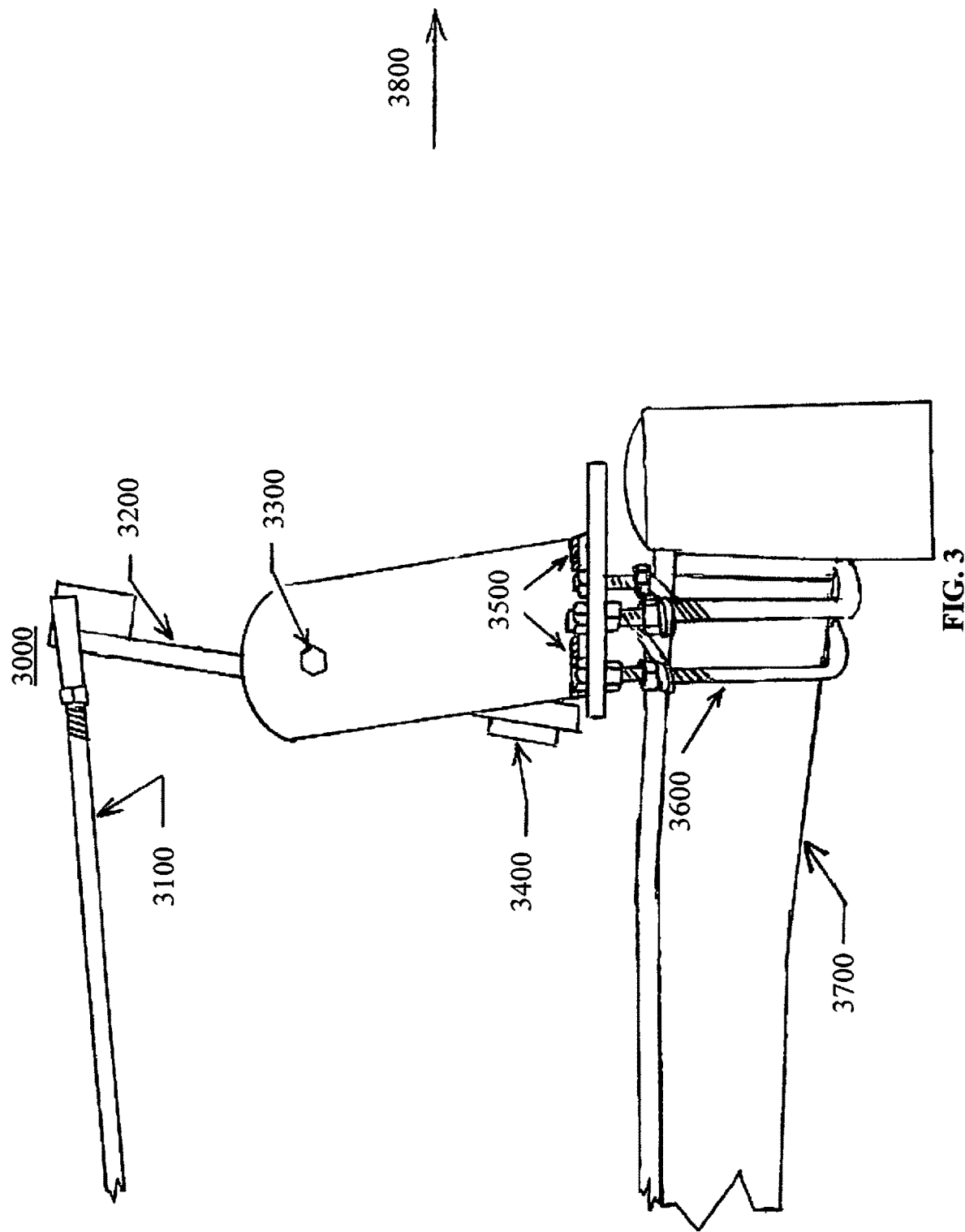
FIG. 3 is a side view of an exemplary embodiment of a system 3000.

FIG. 3 is a side view of an exemplary embodiment of a system 3000, which comprises a forward/reverse rod 3100, a foot pedal 3200, a pivot pin 3300, a heel cup 3400, weld joints 3500, a set of U-clamps 3600, and a mower frame

3700. Pushing an upper portion of forward/reverse rod 3100 causes motion of a machine comprising system 3000 in a forward direction 3800.

Figure 4:
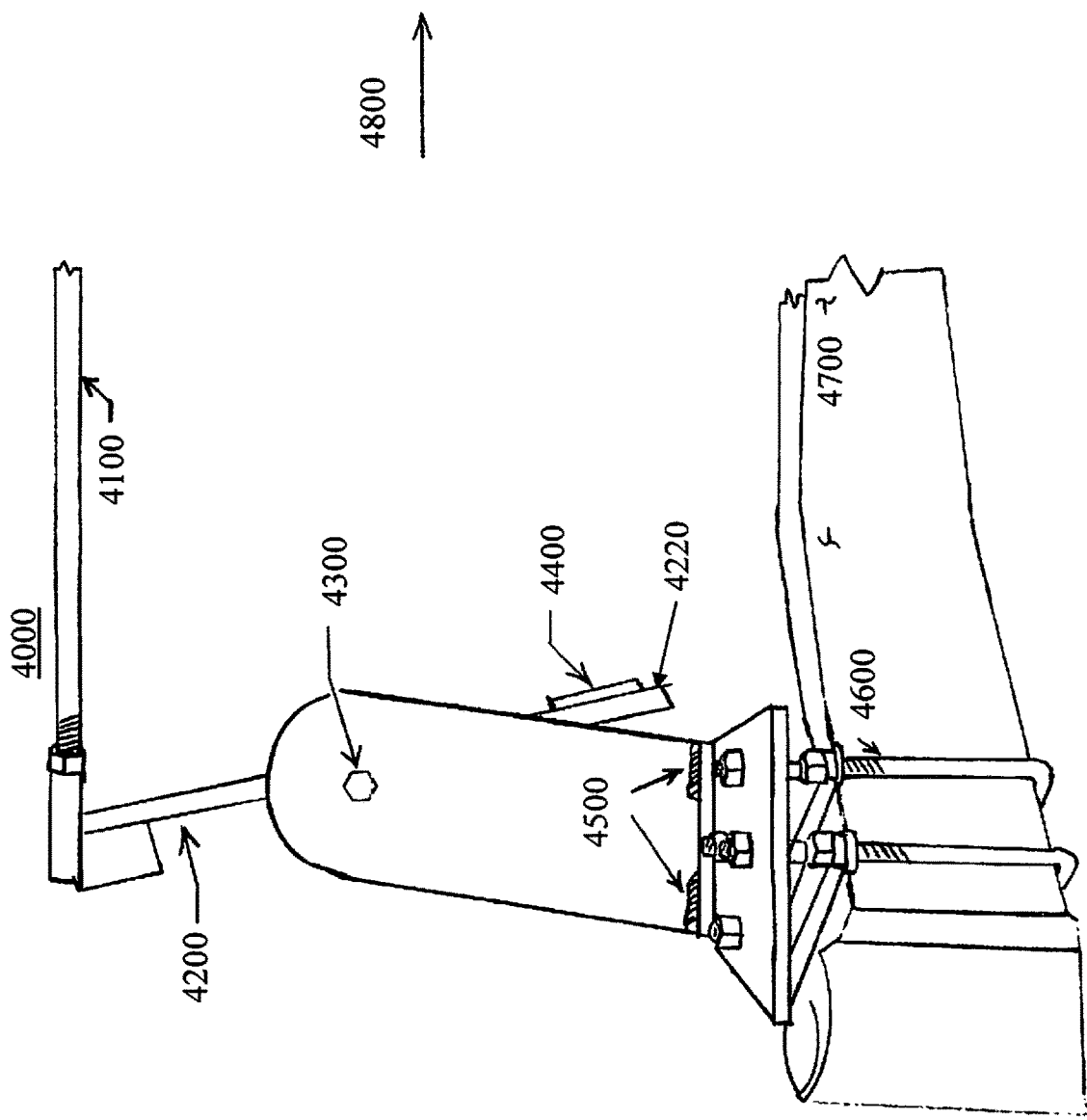
FIG. 4 is a side view of an exemplary embodiment of a system 4000.

FIG. 4 is a side view of an exemplary embodiment of a system 4000, which comprises a forward/reverse rod 4100, a foot pedal 4200, a pivot pin 4300, a heel cup 4400, weld joints 4500, a set of U-clamps 4600, and a mower frame 4700. Pushing a lower portion 4220 of pedal 4200 causes motion of a machine comprising system 4000 in a reverse direction 4800.

Figure 5:
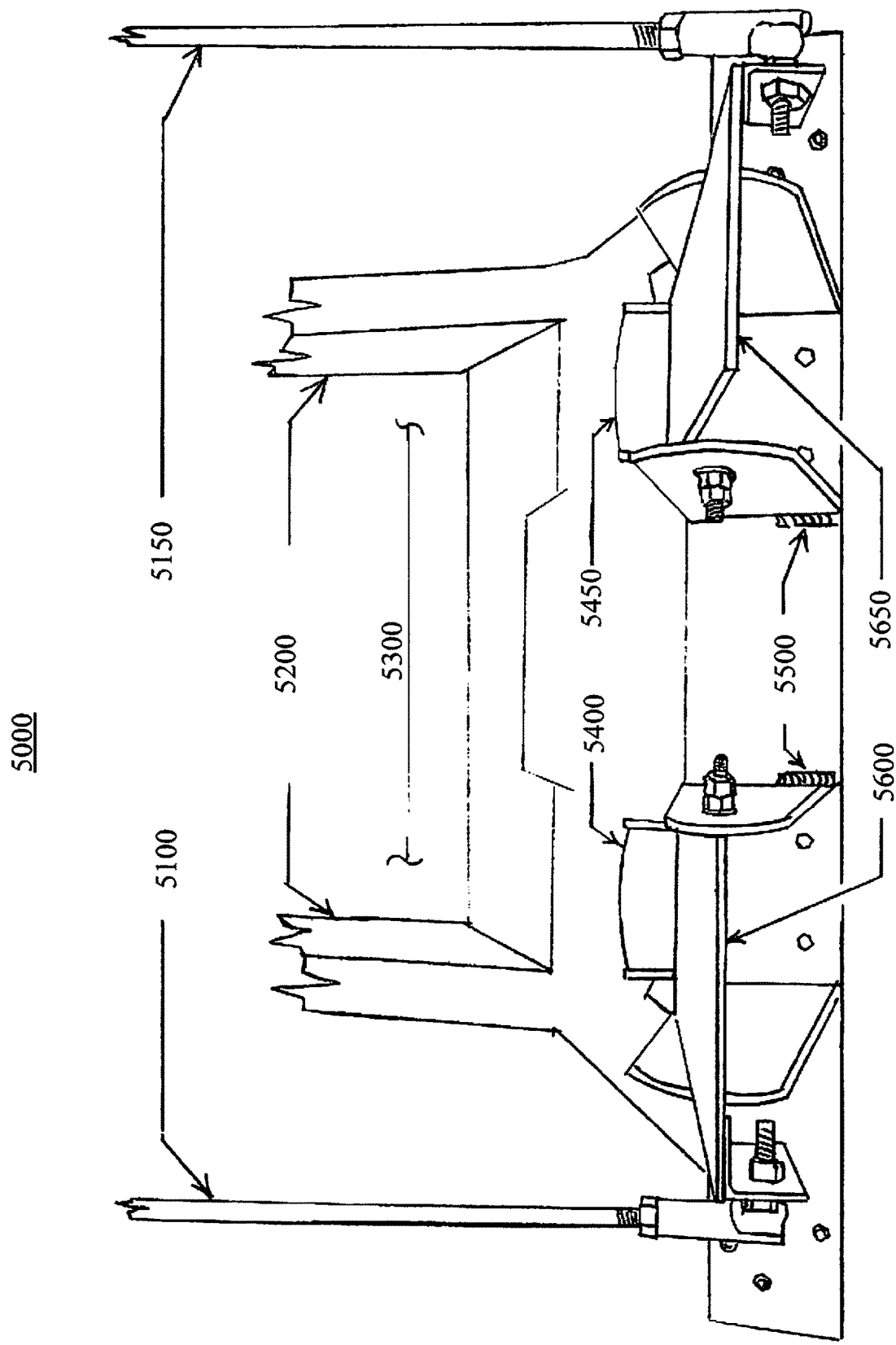
FIG. 5 is a perspective view of an exemplary embodiment of a system 5000.

FIG. 5 is a perspective view of an exemplary embodiment of a system 5000, which comprises a first forward/reverse rod 5100, a second forward/reverse rod 5150, a mower frame 5200, a mower floor pan area 5300, a first heel cup 5400, a second heel cup 5450, weld joints 5500, a first foot pedal 5600, and a second foot pedal 5650.

Figure 6:
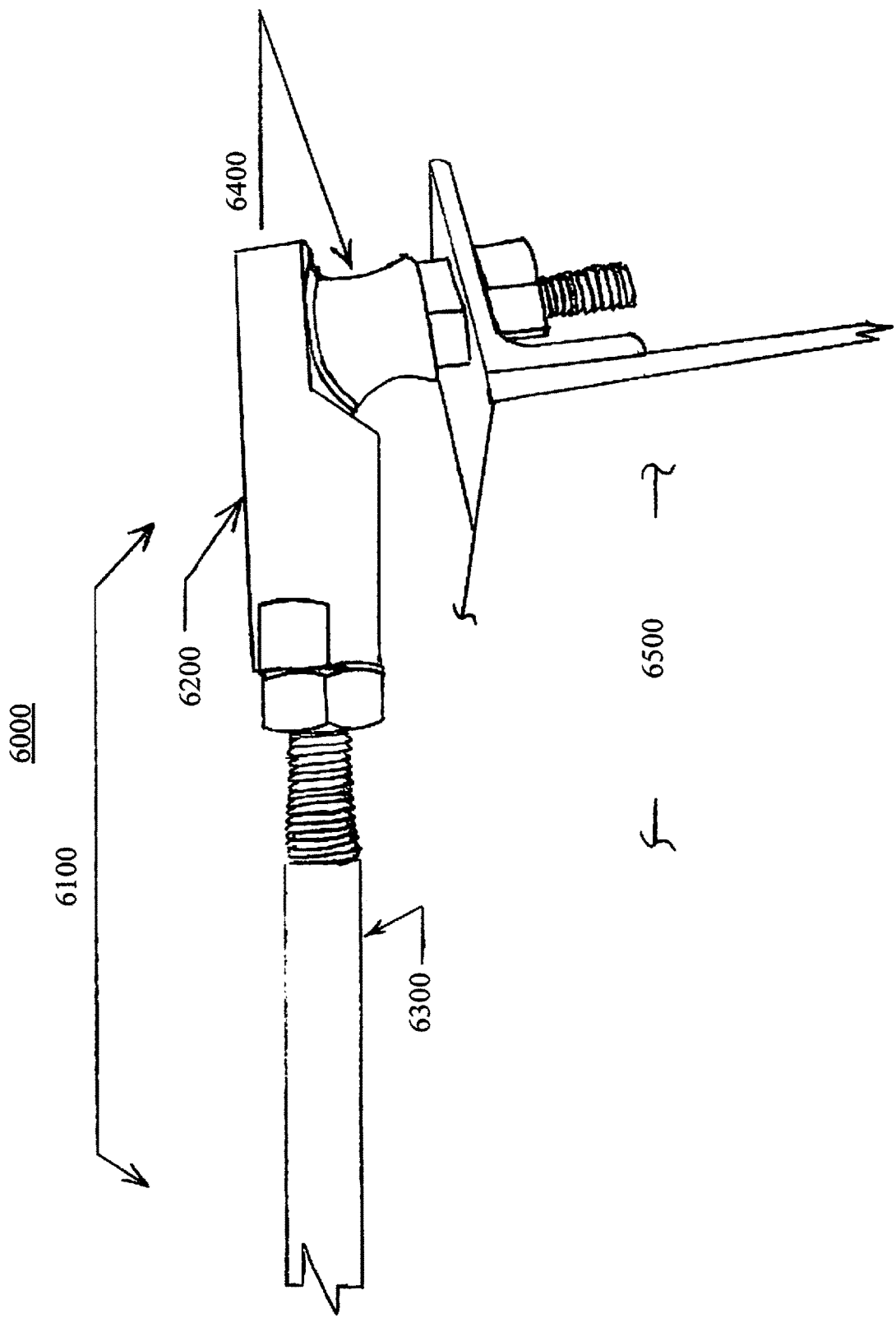
FIG. 6 is a perspective view of an exemplary embodiment of a system 6000.

FIG. 6 is a perspective view of an exemplary embodiment of a system 6000, which comprises a typical arrangement 6100 for right and left pedals, an adjustable length connector 6200, a forward/reverse rod 6300, a rubber seal 6400, and a foot pedal area 6500.

Certain exemplary embodiments comprise forward/reverse rod 6300, adjustable length connector 6200, and rubber seal 6400. In certain exemplary embodiments, forward/reverse rod 6300 is directly coupled to adjustable length connector 6200. Adjustable length connector 6200 is constructed to allow adjustment of a distance between a first foot pedal and a mower linkage. Rubber seal 6400 covers a portion of the adjustable length connector.

FIG. 7 is a perspective view of an exemplary embodiment of a system 7000, which comprises a typical arrangement 7100 for right and left sides, a forward/reverse rod 7200, a swivel connector 7300, a mower console 7400, and a mower linkage 7500. Moving mower linkage 7500 toward a first arrow 7600 causes a riding lawnmower comprising system 7000 in a forward direction. Moving mower linkage 7500 toward a second arrow 7700 causes a riding lawnmower comprising system 7000 in a reverse direction.

Certain exemplary embodiments comprise forward/reverse rod 7200 and swivel connector 7300. Forward/reverse rod 7200 is directly coupled to swivel connector 7300 and swivel connector 7300 is coupled directly to mower linkage 7500.

FIG. 8 is a perspective view of an exemplary embodiment of a system 8000, which comprises a zero turn riding lawnmower 8100. Zero turn riding lawnmower 8100 comprises an attachment bar 8200. Attachment bar 8200 can rotate 360 degrees about a pivot 8250. Attachment bar 8200 is coupled to a chain 8300. Chain 8300 can be coupled to, and partially support a weight of an attachment 8400. Attachment 8400 can be a weed eater, an edge trimmer, a blower, or any other device that a user might wish to utilize while riding zero turn riding lawnmower 8100. By utilizing attachment bar 8200 to provide support for attachment 8400, the use of attachment 8400 can be facilitated for the user. For example, if the user is aged or has certain physical limitations, the use of attachment 8400 can be less challenging via utilization of attachment bar 8200 and chain 8300.

Figure 9:
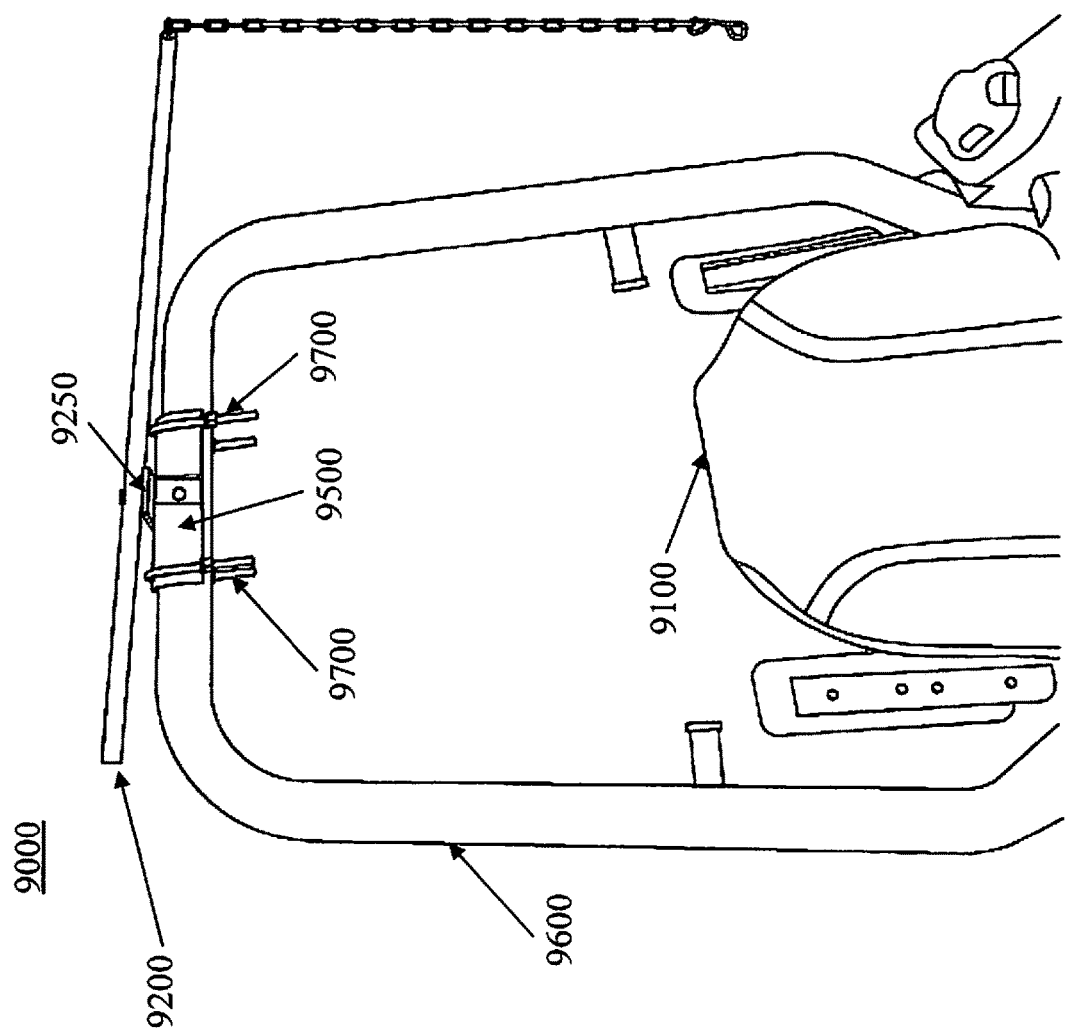
FIG. 9 is a perspective view of an exemplary embodiment of a system 9000.

FIG. 9 is a perspective view of an exemplary embodiment of a system 9000, which illustrates a close-up view of an attachment bar 9200, pivot 9250, and chain 9300. Attachment bar 9200 is coupled to zero turn riding lawnmower 9100 via an attachment bracket 9500. Attachment bracket 9500 is coupled to a roll-bar 9600 via a pair of U-clams 9700. Roll-bar 9600 is coupled to zero turn riding lawnmower 9100. Attachment bar 9200 is coupled to roll-bar 9600 via pivot 9250. Attachment bar 9200 rotates about pivot 9250.

Figure 10:
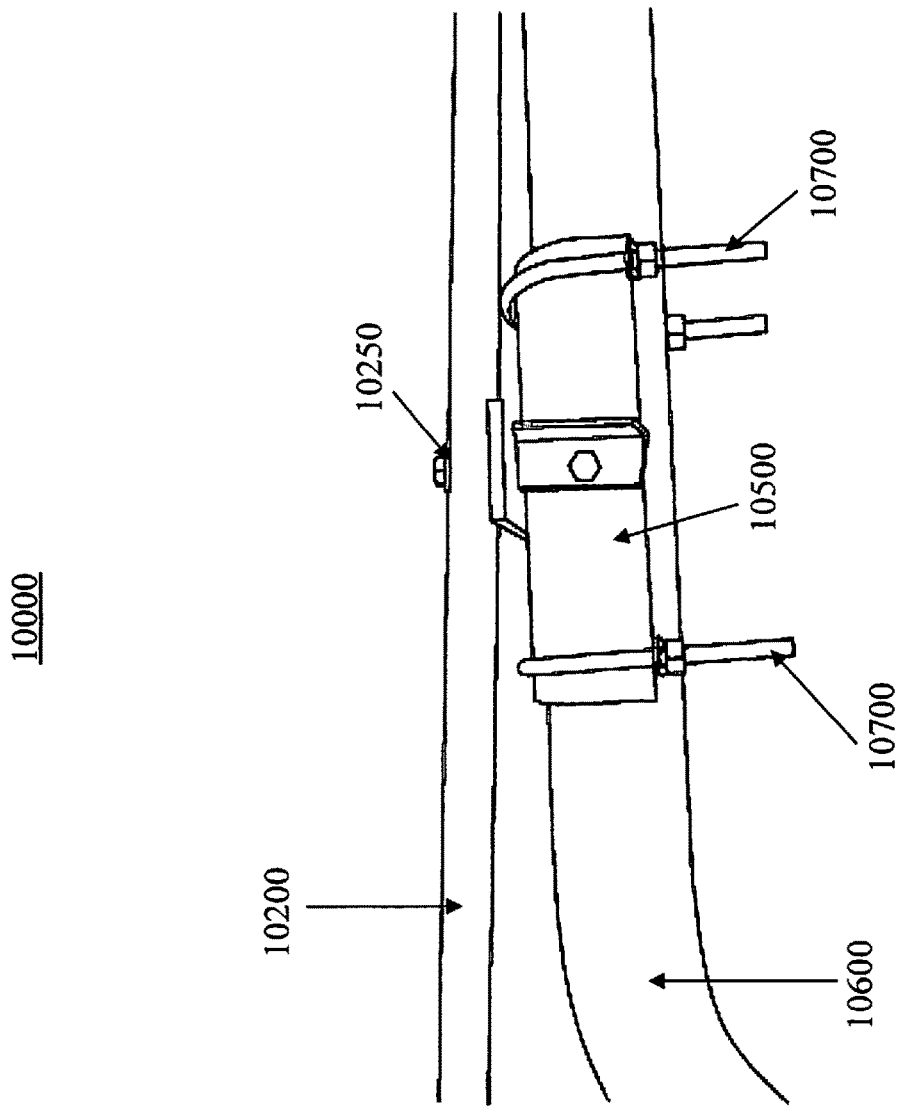
FIG. 10 is a perspective view of an exemplary embodiment of a system 10000.

FIG. 10 is a perspective view of an exemplary embodiment of a system 10000, which illustrates a close-up view of an attachment bar 10200, a pivot 10250, attachment bracket 10500, roll-bar 10600, and pair of U-clamps 10700.

Figure 11:
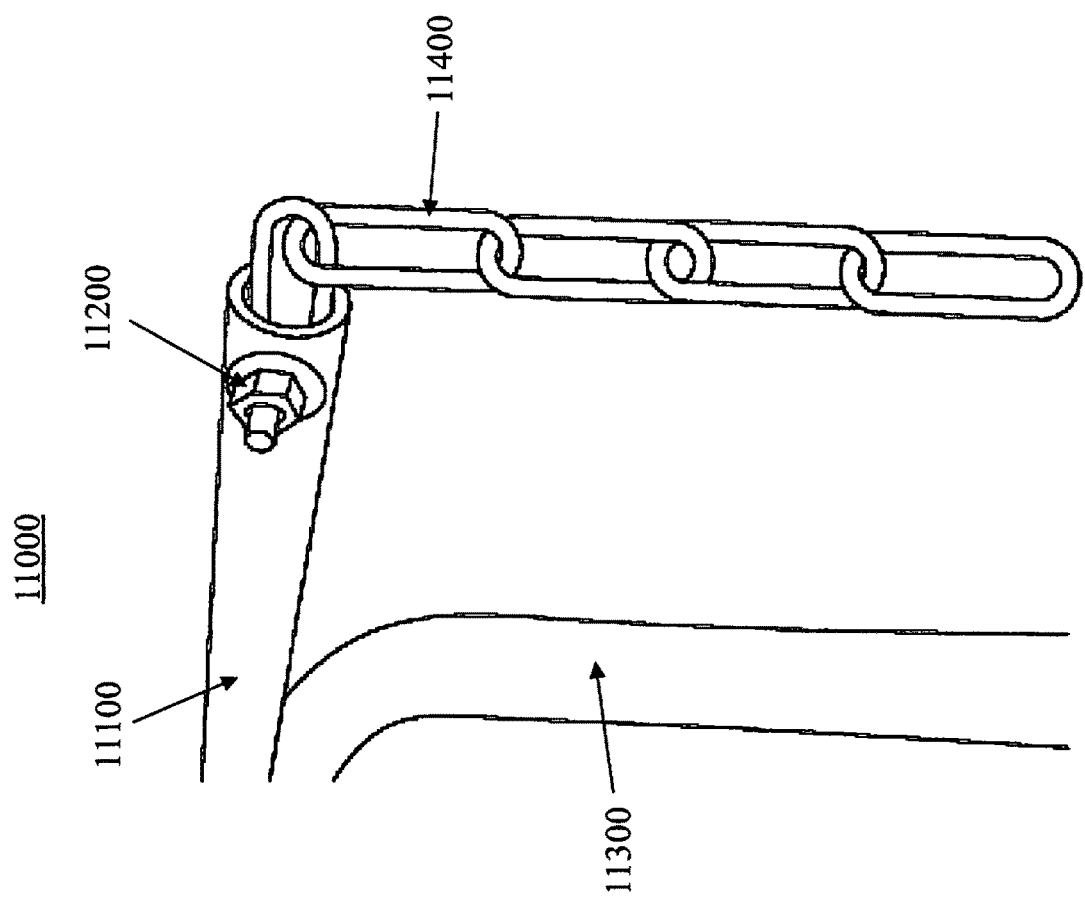
FIG. 11 is a perspective view of an exemplary embodiment of a system 11000.

FIG. 11 is a perspective view of an exemplary embodiment of a system 11000, which illustrates a close-up view of an attachment bar 11100, a fastener 11200, a roll-bar 11300, and chain 11400.

Figure 12:
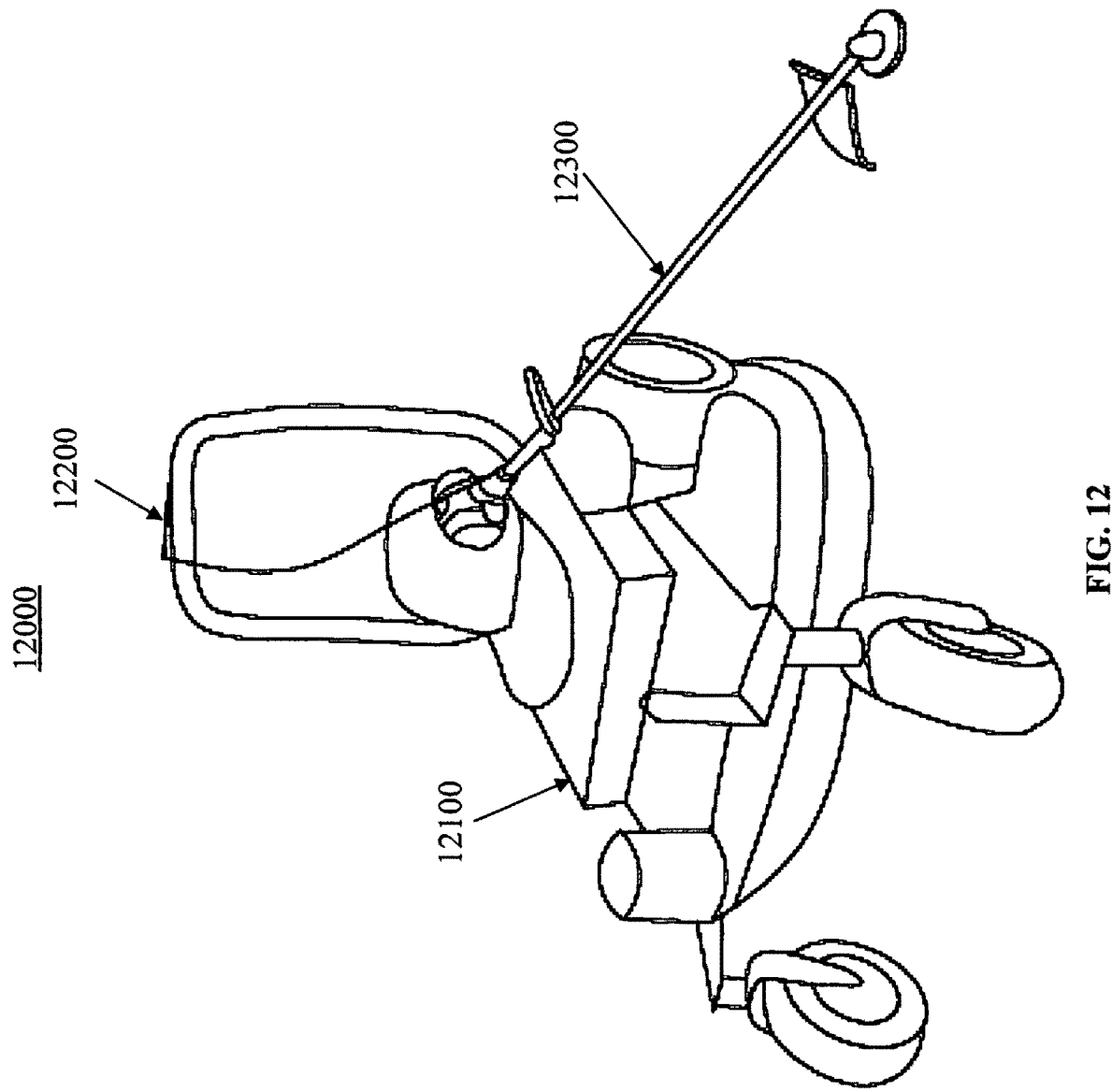
FIG. 12 is a perspective view of an exemplary embodiment of a system 12000.

FIG. 12 is a perspective view of an exemplary embodiment of a system 12000, which illustrates a zero turn riding lawnmower 12100, an attachment bar 12200, and an attachment 12300. FIG. 12 illustrates attachment 12300 on a left side of zero turn riding lawnmower 12100.

Figure 13:
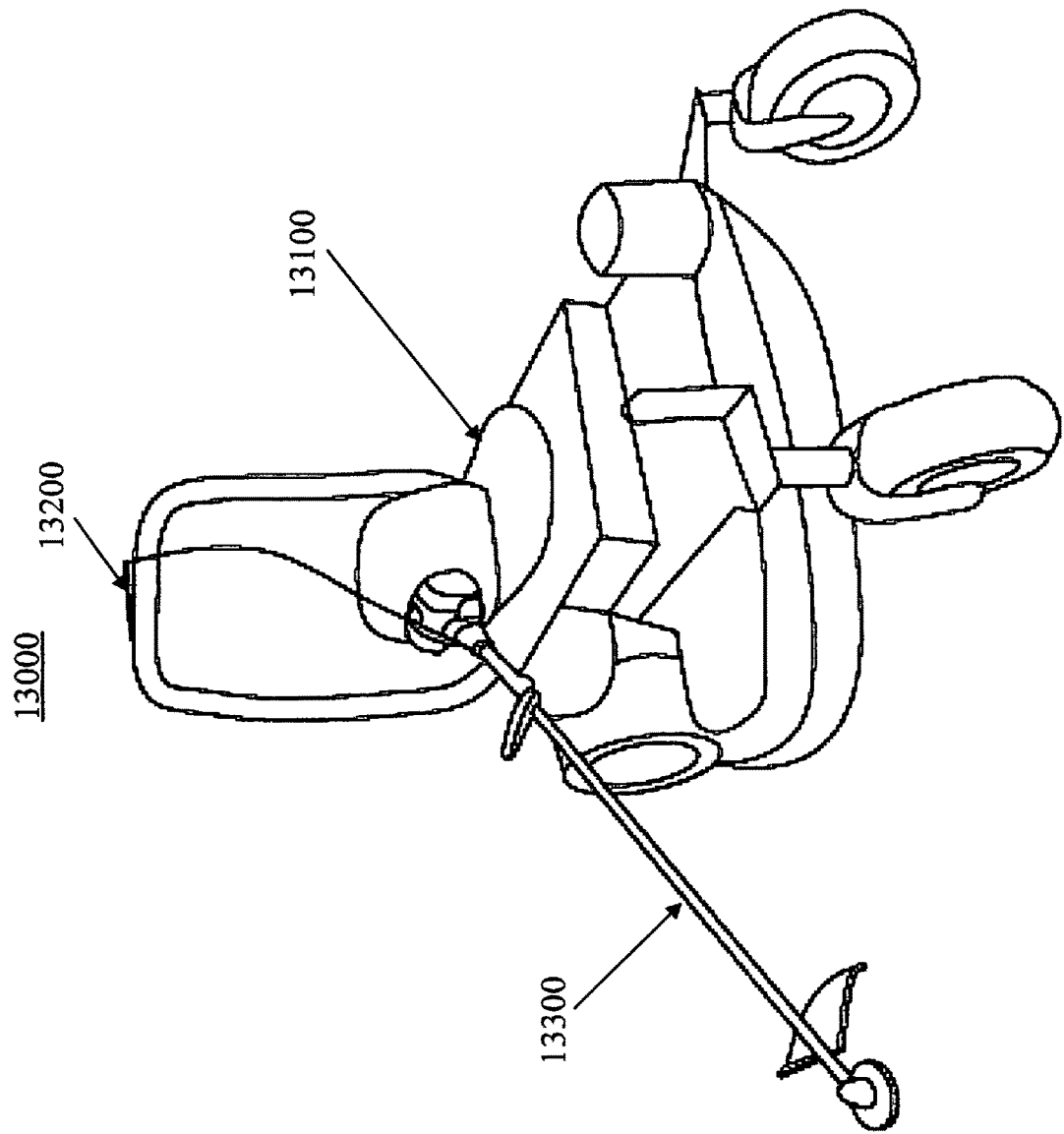
FIG. 13 is a perspective view of an exemplary embodiment of a system 13000.

FIG. 13 is a perspective view of an exemplary embodiment of a system 13000, which illustrates a zero turn riding lawnmower 13100, an attachment bar 13200, and an attachment 13300. FIG. 13 illustrates attachment 13300 on a right side of zero turn riding lawnmower 13100.

Figure 14:
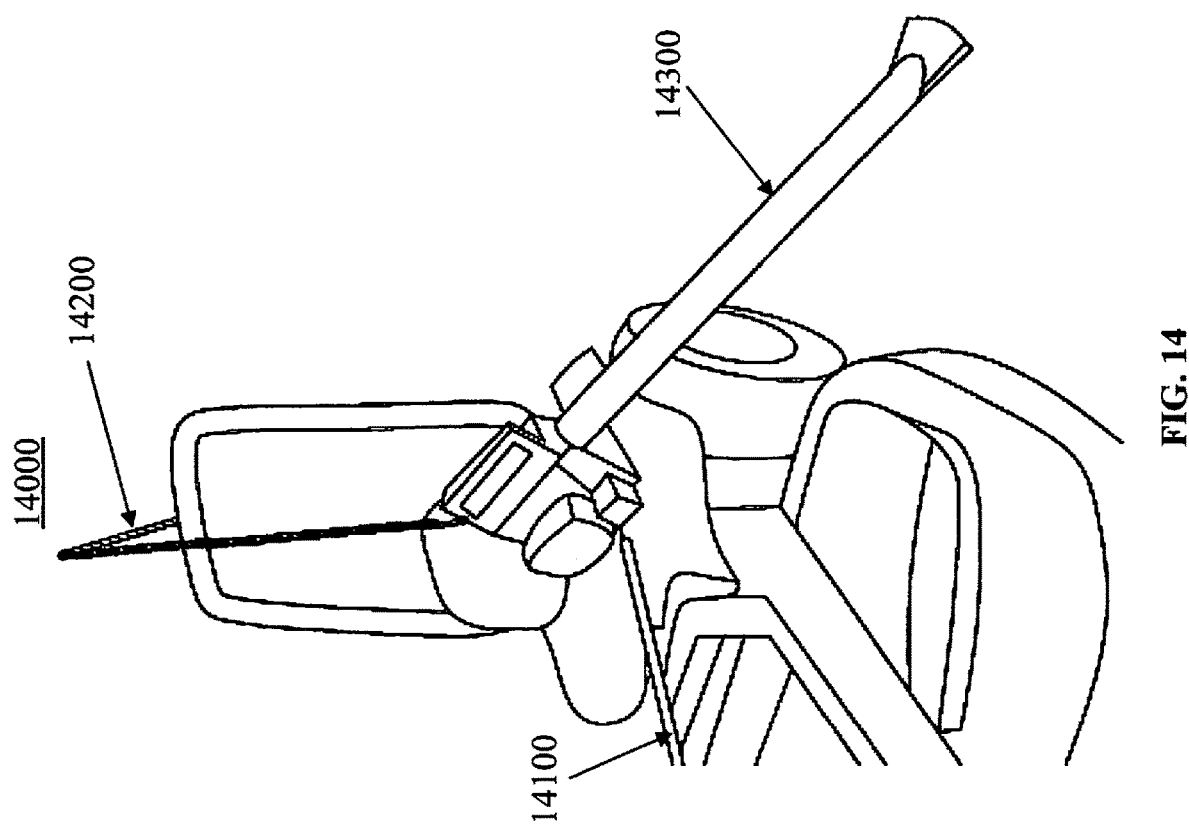
FIG. 14 is a perspective view of an exemplary embodiment of a system 14000.

FIG. 14 is a perspective view of an exemplary embodiment of a system 14000, which illustrates a zero turn riding lawnmower 14100, an attachment bar 14200, and an blower 14300. FIG. 14 illustrates a blower 14300, which is a particular embodiment of a possible attachment as discussed elsewhere herein.

Figure 15:
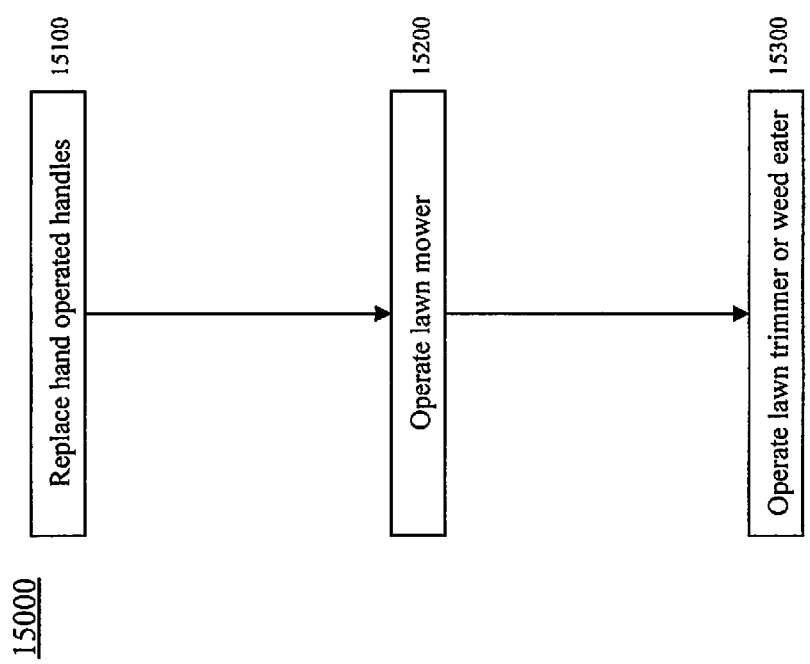
FIG. 15 is a flowchart of an exemplary embodiment of a method 15000.

FIG. 15 is a flowchart of an exemplary embodiment of a method 15000. At activity 15100, hand operated handles of a zero turn riding lawnmower can be replaced via coupling a first foot pedal and a second foot pedal to a mower linkage of the zero turn riding lawnmower. The first foot pedal is constructed to cause at least one wheel on a first side the zero turn riding lawnmower to be powered in a forward or reverse direction. The second foot pedal is constructed to cause at least one wheel on a second side the zero turn riding lawnmower to be powered in a forward or reverse direction.

At activity 15300, a human operated the zero turn riding lawnmower. At activity 15300, the human operates a lawn trimmer weed eater, blower, or other handheld device while riding the zero turn riding lawnmower and steering the zero turn riding lawnmower via the first foot pedal and the second foot pedal.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
accelerate—to have a time rate of change in a velocity of something increase.
activity—an action, act, step, and/or process or portion thereof
actuate—to put into mechanical action or motion.
adapted to—made suitable or fit for a specific use or situation.

adapter—a device used to effect operative compatibility between different parts of one or more pieces of an apparatus or system.
adjust—to change to a sought state.
adjustable length connector—a threaded coupler that allows a threaded rod to be positioned at plurality of effective lengths.
and/or—either in conjunction with or in alternative to.
apparatus—an appliance or device for a particular purpose
associate—to join, connect together, and/or relate.
attachment—a coupled device that is capable of performing a task associated with grounds maintenance. For example an attachment can be a weed eater, an edger, and/or a blower, etc.
attachment bar—a length of material to which an attachment can be coupled.
bracket—a device coupleable to a surface that supports a component.
can—is capable of, in at least some embodiments.
cause—to produce an effect.
chain—a series of metal links coupled one another and used for transmission of mechanical power.
comprising—including but not limited to.
configure—to make suitable or fit for a specific use or situation.
connect—to join or fasten together.
constructed to—made to and/or designed to.
convert—to transform, adapt, and/or change.
coupleable—capable of being joined, connected, and/or linked together.
coupling—linking in some fashion.
create—to bring into being.
decelerate—to have a time rate of change in a velocity of something decrease.
define—to establish the outline, form, or structure of
determine—to obtain, calculate, decide, deduce, and/or ascertain.
device—a machine, manufacture, and/or collection thereof.
directly—substantially without an intervening component or intervening space.
distance—an amount of space between two things.
fastener—one (or more) restraints that attach to, extend through, penetrate, and/or hold something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
foot pedal—a lever actuated by a human foot via which machine motion is controlled.
forward direction—a course advancing a machine.
frame—a supporting structure.
grease fitting—a component that is constructed to be coupled to a lubricant dispenser from which a high viscosity lubricant is dispensed.
heel cup—a ridge shaped for a human heel to rest on the ridge for positioning of a foot of a rider of a machine.
hand operated handle—a part of a thing sized and/or shaped specifically to be grasped or held by a hand of a user that causes a zero turn riding lawnmower to move in a forward direction or a reverse direction.
install—to connect or set in position and prepare for use.
may—is allowed and/or permitted to, in at least some embodiments.
method—a process, procedure, and/or collection of related activities for accomplishing something.
mower linkage—one or more mechanical components that are coupled together, which mechanical components are constructed to cause a lawnmower to move in a forward or a reverse direction which actuated.
operate—to control a function of.
pin—a slender piece of solid material.
pivot—a component around which something rotates.
plate—a substantially planar sheet of material having a thickness.
plurality—the state of being plural and/or more than one.
portion—a part of a whole.
power—to supply with energy so as to cause motion of a machine.
predetermined—established in advance.
project—to calculate, estimate, or predict.
provide—to furnish, supply, give, and/or make available.
receive—to get, take, acquire, and/or obtain.
replace—to substitute for something else.
reverse direction—a course causing a machine to retreat.
ride—to travel on a conveyance.
rod—a thin straight bar having a substantially circular cross-section.
roll-bar—a rigid bar running up the sides and across the top of a machine, which strengthens a frame of the machine and protects users should the machine overturn.
rubber seal—an elastomer device that substantially prevents the passage or particulates into a location at least partially enclosed by the device.
set—a related plurality.
side—a bounding surface of an object.
solely—without anything else.
steer—to control a course of a machine.
substantially—to a great extent or degree.
support—to bear the weight of, especially from below.
swivel connector—a device joining two parts so that one or both can pivot freely.
system—a collection of mechanisms, devices, machines, articles of manufacture, processes, data, and/or instructions, the collection designed to perform one or more specific functions.
transmit—to send, provide, furnish, and/or supply.
U-clamp—a device which is bent such that the two ends are parallel that is used to couple machine components.
via—by way of and/or utilizing.
weight—a value indicative of importance.
wheel—a solid disk or a rigid circular ring connected by spokes to a hub, designed to turn around an axle passed through the center.
zero turn riding lawnmower—a machine on which a human sits, which machine utilizes one or more revolving blades to cut a grass surface to an even height, The machine has a turning radius that is effectively zero when the two drive wheels rotate in opposite direction, like a tank turning in place. Different brands and models achieve this in different ways, with hydraulic speed control of each drive wheel being a method when a gasoline or diesel engine is used. Battery powered models can use two electric motors. Exemplary models have four wheels: two small swiveling front tires and two large drive tires in the back. The mower can pivot around a point midway between the drive wheels, or it can pivot around either one of the drive wheels if one is stationary, or it can turn in a circle of any radius. Reversal of the direction of travel can be accomplished by causing both wheels to rotate in reverse.

Note
Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- no characteristic, function, activity, or element is "essential";
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a zero turn riding lawnmower, the zero turn riding lawnmower steerable solely via a first foot pedal and a second foot pedal, each of the first foot pedal and the second foot pedal coupled to a mower linkage of the zero turn riding lawnmower, the first foot pedal constructed to cause at least one wheel on a first side the zero turn riding lawnmower to be powered in a forward direction or a reverse direction, the second foot pedal constructed to cause at least one wheel on a second side the zero turn riding lawnmower to be powered in a forward or reverse direction;
a forward/reverse rod;
an adjustable length connector; and
a rubber seal,
wherein:
the forward/reverse rod is directly coupled to the adjustable length connector, the adjustable length connector constructor constructed to allow adjustment of a distance between the first foot pedal and the mower linkage; and
the rubber seal covers a portion of the adjustable length connector.

2. The system of claim 1, further comprising:
a forward/reverse rod that couples the first foot pedal to the mower linkage.

3. The system of claim 1, further comprising:
a forward/reverse rod; and
a swivel connector;
wherein the forward/reverse rod is directly coupled to the swivel connector and the swivel connector is coupled directly to the mower linkage.

4. The system of claim 1, further comprising:
a pivot pin coupled to the first foot pedal, wherein the pivot pin comprises a grease fitting.

5. The system of claim 1, further comprising:
a set of U-clamps that couple a plate to a mower frame of the zero turn riding lawnmower, the plate coupled to the first foot pedal and the second foot pedal.

6. The system of claim 1, wherein:
at least one of the first foot pedal and the second foot pedal are constructed to cause the zero turn riding lawnmower to accelerate when actuated by a user.

7. The system of claim 1, wherein:
at least one of the first foot pedal and the second foot pedal are constructed to cause the zero turn riding lawnmower to decelerate when actuated by a user.

8. The system of claim 1, wherein:
each of the first foot pedal and the second foot pedal are coupled to the zero turn riding lawnmower via a bracket, each bracket comprising a first plate and a second plate.

9. The system of claim 1, wherein:
each of the first foot pedal and the second foot pedal are coupled to the zero turn riding lawnmower via a corresponding bracket, each bracket comprising a first plate and a second plate, wherein a pivot pin in utilized to couple each foot pedal to the corresponding bracket.

10. The system of claim 1, wherein:
each of the first foot pedal and the second foot pedal comprise a heel cup, the heel cup constructed to engage with a heel of a foot of a user.

11. The system of claim 1, further comprising:
a pair of U-clamps;
an attachment bracket; the attachment bracket coupled to a roll-bar of the zero turn riding lawnmower via the pair of U-clamps;
a pivot fastener;
an attachment bar, the attachment bar coupled to the attachment bracket via the pivot fastener;

a chain, the chain coupled to the attachment bar; and
an attachment, the attachment coupled to the chain.

12. A system comprising:
a zero turn riding lawnmower, the zero turn riding lawnmower comprising:
a first foot pedal, the first foot pedal coupled to a mower linkage of the zero turn riding lawnmower, the first foot pedal constructed to cause at least one wheel on a first side the zero turn riding lawnmower to be powered in a forward direction or a reverse direction;
a second foot pedal, the second foot pedal coupled to the mower linkage of the zero turn riding lawnmower, the second foot pedal constructed to cause at least one wheel on a second side the zero turn riding lawnmower to be powered in a forward or reverse direction, wherein the zero turn riding lawnmower is steerable solely via each of the first foot pedal and the second foot pedal;
a roll-bar, the roll-bar coupled to the zero turn riding lawnmower;
an attachment bar;
a pivot, the attachment bar coupled to the roll-bar via the pivot, wherein the attachment bar rotates about the pivot; and
a chain, the chain coupled to the attachment bar via a fastener, the chain coupleable to an attachment, the attachment comprising at least one of a weed eater, an edger, and a blower.

13. The system of claim 12, further comprising:
a pair of U-clamps; and
an attachment bracket; the attachment bracket coupled to the roll-bar of the zero turn riding lawnmower via the pair of U-clamps, wherein the attachment bar is coupled to the zero turn riding lawnmower via the attachment bracket.

14. A method comprising:
replacing hand operated handles of a zero turn riding lawnmower via coupling a first foot pedal and a second foot pedal to a mower linkage of the zero turn riding lawnmower, the first foot pedal constructed to cause at least one wheel on a first side the zero turn riding lawnmower to be powered in a forward or reverse direction, the second foot pedal constructed to cause at least one wheel on a second side the zero turn riding lawnmower to be powered in a forward or reverse direction;
installing a forward/reverse rod;
installing an adjustable length connector; and
installing a rubber seal;
wherein:
the forward/reverse rod is directly coupled to the adjustable length connector, the adjustable length connector constructor constructed to allow adjustment of a distance between the first foot pedal and the mower linkage; and
the rubber seal covers a portion of the adjustable length connector.

15. The method of claim 14, further comprising:
operating an attachment while riding the zero turn riding lawnmower while steering the zero turn riding lawnmower via the first foot pedal and the second foot pedal.

16. The method of claim 14, further comprising:
operating a portable blower while riding the zero turn riding lawnmower while steering the zero turn riding lawnmower via the first foot pedal and the second foot pedal.

17. The method of claim 14, further comprising:
operating a portable weed eater while riding the zero turn riding lawnmower while steering the zero turn riding lawnmower via the first foot pedal and the second foot pedal.

* * * * *